Figure 1:
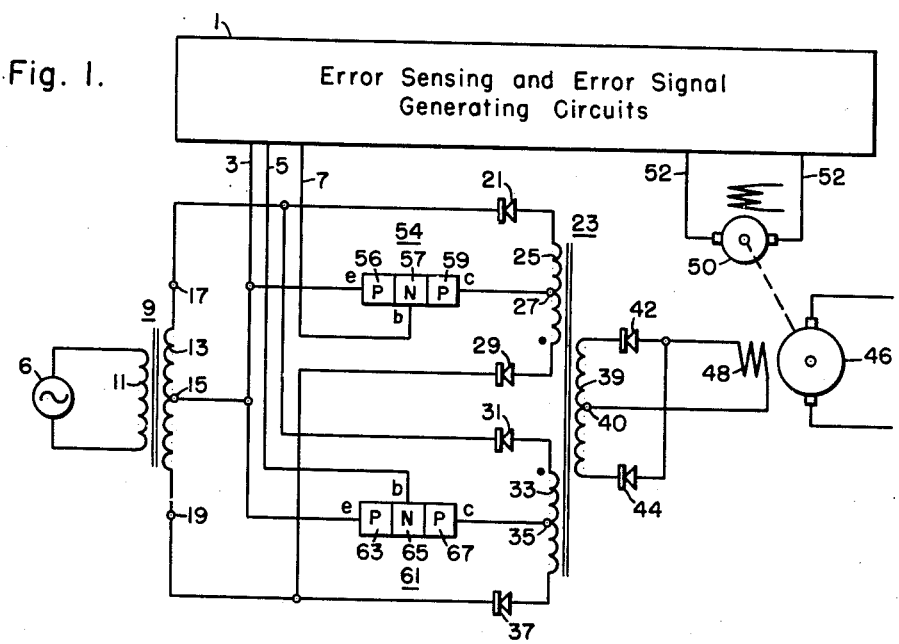

Nov. 12, 1957

W. B. GUGGI 2,813,244

TRANSISTOR AMPLIFIER

Filed Aug. 8, 1956

WITNESSES
Robert C Baird
Wm. B. Sellers.

INVENTOR
Walter B. Guggi.
BY
John B. Davidson
ATTORNEY

United States Patent Office 2,813,244
Patented Nov. 12, 1957

2,813,244

TRANSISTOR AMPLIFIER

Walter B. Guggi, Palo Alto, Calif., assignor to Westinghouse Electric Corporation, East Pittsburgh, Pa., a corporation of Pennsylvania Application August 8, 1956, Serial No. 602,840

6 Claims. (Cl. 323—22)

This invention relates to motor control systems, and more particularly to systems wherein junction transistors are utilized as control elements.

It has been known in the prior art to utilize junction transistors as control elements in applications such as speed control of an electrical motor. An example of a prior art system that has been particularly successful in this field is that described in application Serial No. 506,474, filed May 6, 1955, of Walter B. Guggi for "Motor Control System," now Patent No. 2,767,365. This system utilizes a junction transistor to control current flow from the primary of a transformer through the center tap connection thereof, unilateral conduction devices being connected to the outer terminals so as to oppose current flow from each other but aid current flow through the transistor. The field of the motor is coupled to the secondary of the transformer through fullwave rectifier means by biasing the transistor alternately between cutoff and full collector current conduction. The source of power thus can be effectively coupled and decoupled to the primary of the transformer. By varying the duty cycle of pulses controlling current conduction through the transistor in accordance with the speed of the motor, the motor speed can be regulated very exactly.

While the motor control system described above has been found to be eminently satisfactory in the applications for which it was designed, it suffers from variation in collector current through the transistor with changes in the temperature of the transistor. While it is possible to use non-linear circuit elements to compensate for this undesired effect, such an expedient is undesirable because of rather difficult design problems that arise therefrom. More particularly, it is mandatory that the characteristic of the non-linear circuit element be matched to the characteristic of the transistor for every design configuration to which the circuit is to be applied.

Accordingly, one object of the invention is to provide a system for coupling an alternating current source to a load, utilizing transistor means for control purposes, wherein compensation is automatically made for the variation of transistor characteristics with changes in the operating temperature of the transistor.

Another object is to provide a substantially temperature insensitive system utilizing transistor means for control purposes in coupling an alternating current source to a load.

Figure 2:
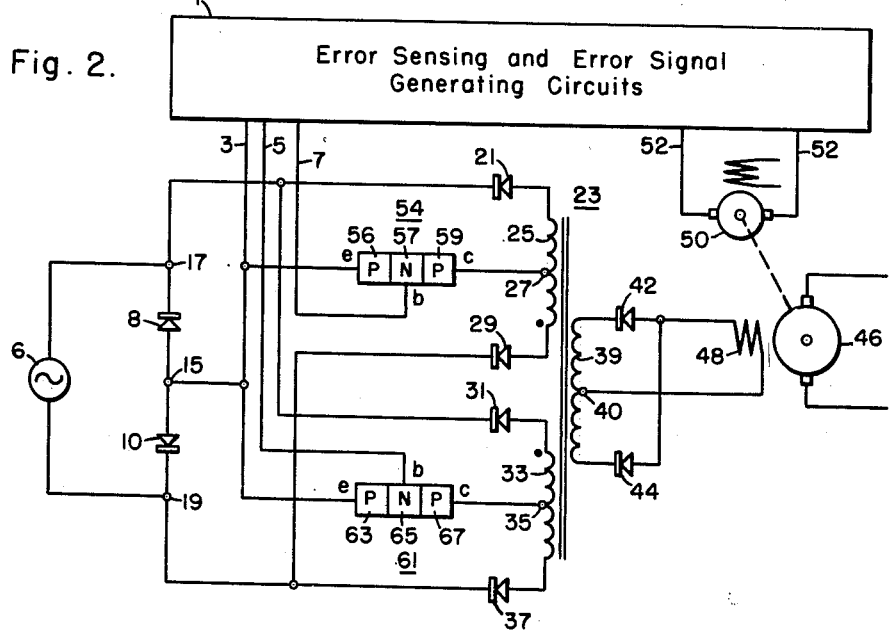

Other objects and features of the invention will become apparent from the following description thereof when taken in conjunction with the accompanying drawing, wherein:

Figure 1 is a schematic diagram of a motor control system in accordance with the teachings of the present invention; and Fig. 2 is a schematic diagram of an embodiment of the invention similar to that of Fig. 1 but eliminating certain of the more expensive circuit components thereof.

According to one aspect of the invention, an alternating current source is coupled to a load through apparatus having a pair of input circuits each having an electrically neutral terminal, the load being coupled to the output circuit thereof. Junction transistor means are utilized to couple the electrically neutral terminal of each of the input circuits to the alternating current source and a pair of half-wave rectifiers are utilized to couple the outer terminals of each of the input terminals to the source so as to oppose each other but aid current flow through the junction transistor in the manner taught by the prior art cited above. The junction transistors are chosen so as to have essentially the same variation of collector current with variation in the temperature thereof. The input circuits are coupled to the output circuit in a manner such that the change in current through one of the input circuits brought about by variation in the temperature of the transistor connected thereto will bring about a voltage change in the output circuit of opposite polarity to the change in voltage in the output circuit affected by a similar change in the temperature of the transistor connected to the other input circuit. Thus, the output signal will be effectively dependent only on the control signal controlling current flow through the transistors and the magnitude of the alternating source and will be substantially independent of variation in transistor temperature.

More specifically and with reference to Fig. 1, there is shown a control circuit for controlling the speed of motor 46 by variation in the current through motor field winding 48. Field winding 48 is coupled to the respective halves of transformer secondary 39 of transformer 23 by means of half-wave rectifiers 42 and 44. In effect, half-wave rectifiers 42 and 44 form a full-wave rectifier so that alternating current appearing across secondary winding 39 is rectified and applied to field winding 48. Transformer 23 has a pair of center-tapped primary windings 25 and 33. The outer terminals of primary winding 25 are coupled to the outer terminals 17 and 19 of the secondary 13 of transformer 9 by means of half-wave rectifiers 21 and 29, respectively, so as to oppose current flow from the outer terminals of secondary winding 13 to primary winding 33. For the purpose of controlling current flow between the center-tapped terminal 15 and center-tapped terminal 27, a transistor, shown as being of the P-N-P type, is connected between the center taps with emitter 56 connected to center tap 15 and collector 59 to center tap 27. Primary winding 33 is coupled to primary winding 13 in similar manner, half-wave rectifiers 31 and 37 being utilized to couple the output terminals of primary winding 33 to the output terminals 17 and 19 of secondary 13 and P-N-P junction transistor 61 being interposed between center-tapped terminals 15 and 35 with emitter 63 connected to terminal 15 and collector 67 to terminal 35. An alternating current source 6 is connected across the primary winding 11 of transformer 9. The junction transistors are chosen so as to have substantially the same output current as the semiconductive temperature characteristic as indicated above. The primary windings 25 and 33 of the transformer 23 are wound on the transformer so that changes in the currents through the respective windings produced as a result of change in the transistor temperature will induce equal and opposite voltages across the secondary 39 of the transformer.

Control biasing potentials for the transistors are derived from error sensing and error generating circuits 1 which may be of the same general type as described in the aforementioned application, Serial No. 506,474 of Walter B. Guggi. The output signals from the error signal generating circuit are controlled by a tachometer 50 which is mechanically connected to motor 46 so that the output voltage appearing across leads 52 is indicative of the speed of the motor. The output leads 3, 5 and 7 of error circuits 1 are coupled respectively to emitters 56 and 63, base electrode 65 of transistor 61 and base electrode 57 of transistor 54. The output signals appearing between leads 3 and 7 should be equal and of opposite polarity with respect to lead 5 so that the control effects on the collector current of transistor 54 will be opposite and substantially equal in magnitude to the control effect of the collector current on transistor 61. In operation let it be assumed that the motor is running at a predetermined speed so that the transistors 54 and 61 are being biased so as to obtain an output voltage across secondary 39 just sufficient to produce current flow through field 48 that will maintain the speed of the motor constant. Should a load be placed upon the motor 46 that will change its speed, the magnitude of current flow through the transistors should decrease so as to lessen current flow through field 48 and increase the motor speed to its original value. It should be noted that current is derived from alternating current source 6 and that the transistors are utilized only to control the current through the primary winding so that a control signal of relatively small amplitude may be applied to the transistors from error circuits 1. Should the temperature of the transistors vary, the current change effected thereby will be equal in magnitude and the voltage components induced in the secondary winding as a result of the temperature changes will be equal in magnitude and opposite in polarity, therefore, effectively cancelling each other. Thus, changes in temperature of the transistors will have substantially no effect on the output current from secondary winding 39.

The circuitry of Fig. 2 is substantially the same as that of Fig. 1 with the exception that transformer 9 has been replaced by half-wave rectifier 8 connected to effect current flow from terminal 15 to terminal 17 and half-wave rectifier 10 is connected to effect current flow from terminal 15 to terminal 19. In effect, the entire output voltage of alternating current source 6 is coupled across the halves of the primary windings on each half cycle through the respective transistors. This manner of connection of the source 6 to the primary windings has been described in the aforementioned application, Serial No. 506,474 and reference is made to that application for a more detailed description thereof.

Various changes may be made in the above-described invention and different embodiments of the invention may be made without departing from the spirit and scope thereof. For example, the invention may be used as a differential amplifier, or as a photoamplifier by utilizing phototransistors and comparing the intensity of two light sources, each shining on one of the phototransistors. Therefore, it is intended that all of the matter contained in the above description and shown in the accompanying drawing shall be construed as illustrative and not in a limiting sense.

I claim as my invention:

1. Apparatus for effecting a controllable transfer of energy from an alternating current source to a load comprising: first means coupled to said current source having a three terminal, balanced output circuit including a neutral terminal; second means having first and second three terminal, balanced input circuits each including a neutral terminal, and an output circuit coupled to said load, coupling means including first transistor means coupling said neutral terminal of said first means to said neutral terminal of said first input circuit means through the emitter-to-collector current conduction path thereof; coupling means including second transistor means coupling said neutral terminal of said first means to said neutral terminal of said second input circuit means through the emitter-to-collector current conduction path thereof; said transistor means having substantially the same collector current vs. semiconductor temperature characteristics; first and second unilateral conduction means coupling the outer terminals of said three-terminal balanced output circuit to the outer terminals of said first three-terminal balanced input circuit so as to oppose current flow through each other and aid current flow through said first transistor means; third and fourth unilateral conduction means coupling the outer terminals of said three terminal balanced output circuit to the outer terminals of said second three terminal balanced input circuit so as to oppose current flow through each other and aid current flow through said second transistor means; said first and second balanced input circuits being coupled to said output circuit of said second means so that current variations in said first and second balanced input circuits produced by variations in the temperature of said first and second transistor means will produce oppositely polarized voltages in said output circuit of said second means.

2. Apparatus for effecting a controllable transfer of energy from an alternating current source to a load comprising: first means coupled to said current source having a three terminal, balanced output circuit including a neutral terminal; second means having first and second three terminal, balanced input circuits each including a neutral terminal, and an output circuit coupled to said load, coupling means including first transistor means coupling said neutral terminal of said first means to said neutral terminal of said first input circuit means through the emitter-to-collector current conduction path thereof; coupling means including second transistor means coupling said neutral terminal of said first means to said neutral terminal of said second input circuit means through the emitter-to-collector current conduction path thereof; said transistor means having substantially the same collector current vs. semiconductor temperature characteristics; first and second unilateral conduction means coupling the outer terminals of said three-terminal balanced output circuit to the outer terminals of said first three-terminal balanced input circuit so as to oppose current flow through each other and aid current flow through said first transistor means; third and fourth unilateral conduction means coupling the outer terminals of said three terminal balanced output circuit to the outer terminals of said second three terminal balanced input circuit so as to oppose current flow through each other and aid current flow through said second transistor means; said first and second balanced input circuits being coupled to said output circuit of said second means so that current variations in said first and second balanced input circuits produced by variations in the temperature of said first and second transistor means will produce oppositely polarized voltages in said output circuit of said second means; and means for oppositely controlling current flow through said first and second transistor means.

3. Apparatus for effecting a controllable transfer of energy from an alternating current source to a load, comprising: first transformer means having primary winding means coupled to said source, and a center-tapped secondary winding means; second transformer means having secondary winding means coupled to said load, and first and second center-tapped primary means; first junction transistor means coupling the center tap of said first center-tapped primary means to the center tap of said center-tapped secondary means through the emitter-to-collector current conduction path thereof; second junction transistor means coupling the center tap of said second center-tapped primary winding means to said center tap of said center-tapped secondary means through the emitter-to-collector current conduction path thereof; first and second half-wave rectifier means coupling the outer terminals of said first center-tapped primary winding means to the outer terminals of said center-tapped secondary winding means so as to oppose current conduction through each other and to aid current conduction through said first transistor means; third and fourth half-wave rectifier means coupling said outer terminals of said first center-tapped secondary means to the outer terminals of said second center-tapped primary means so as to oppose current conduction through each other and to aid current conduction through said second transistor means; means coupled to said first and second transistor means for controlling current conduction therethrough in opposition; the variation in collector current as a function of semiconductor temperature of said first and second transistor means being substantially the same.

4. Apparatus for effecting a controllable transfer of energy from an alternating current source to a load, comprising: first transformer means having primary winding means coupled to said source, and a center-tapped secondary winding means; second transformer means having secondary winding means coupled to said load, and first and second center-tapped primary winding means; first junction transistor means coupling the center tap of said first center-tapped primary means to the center tap of said center-tapped secondary means through the emitter-to-collector current conduction path thereof; second junction transistor means coupling the center tap of said second center-tapped primary winding means to said center tap of said center-tapped secondary means through the emitter-to-collector current conduction path thereof; first and second half-wave rectifier means coupling the outer terminals of said first center-tapped primary winding means to the outer terminals of said center-tapped secondary winding means so as to oppose current conduction through each other and to aid current conduction through said first transistor means; third and fourth half-wave rectifier means coupling said outer terminals of said first center-tapped secondary means to the outer terminals of said second center-tapped primary means so as to oppose current conduction through each other and to aid current conduction through said second transistor means; means coupled to said first and second transistor means for controlling current conduction therethrough in opposition; the variation in collector current as a function of semiconductor temperature of said first and second transistor means being substantially the same, said first and second center-tapped primary means being coupled to said secondary winding means of said second transformer means so that current variation in said first and second primary means effected by changes in temperature of said first and second transistor means will produce oppositely polarized voltage components in said secondary winding means of said second transformer means.

5. Apparatus for effecting a controllable transfer of energy from an alternating current source to a load comprising: transformer means having secondary winding means coupled to said load, and first and second center-tapped primary winding means, each of said primary winding means having a pair of outer terminals and a center tap terminal; balanced input circuit means adapted to be coupled to said current source, said circuit means having a neutral terminal and a pair of outer terminals; first and second transistor means, each having at least emitter, collector, and base electrodes, for coupling said neutral terminal to the center taps of said first and second primary winding means respectively; said first and second transistor means having substantially the same collector current vs. semiconductor temperature characteristic; first and second unilateral conduction means for coupling said pair of outer terminals of said input circuit means to said pair of outer terminals of said first center-tapped primary winding means so as to permit current flow through said first transistor means and oppose current flow through each other; third and fourth unilateral conduction means for coupling said pair of outer terminals of said input circuit means to said pair of outer terminals of said second primary winding means so as to permit current flow through said second transistor means and to oppose current flow through each other; means coupled to said base electrodes of said first and second transistor means adapted to oppositely vary current flow through said first and second transistor means, said first and second primary winding means being coupled to said pair of outer input terminals so that current variations produced by changes in semiconductor temperature produce oppositely polarized induced voltages in said secondary winding means.

6. Apparatus for effecting a controllable transfer of energy from an alternating current source to a load comprising: transformer means having secondary winding means coupled to said load, and first and second center-tapped primary winding means, each of said primary winding means having a pair of outer terminals and a center tap terminal; balanced input circuit means adapted to be coupled to said current source, said circuit means having a neutral terminal and a pair of outer terminals; first and second transistor means, each having at least emitter, collector, and base electrodes, for coupling said neutral terminal to the center taps of said first and second primary winding means respectively; said first and second transistor means having substantially the same collector current vs. semiconductor temperature characteristic; first and second unilateral conduction means for coupling said pair of outer terminals of said input circuit means to said pair of outer terminals of said first center-tapped primary winding means so as to permit current flow through said first transistor means and oppose current flow through each other; third and fourth unilateral conduction means for coupling said pair of outer terminals of said input circuit means to said pair of outer terminals of said second primary winding means so as to permit current flow through said second transistor means and to oppose current flow through each other; means coupled to said base electrodes of said first and second transistor means adapted to oppositely vary current flow through said first and second transistor means, said first and second primary winding means being coupled to said pair of outer input terminals so that current variations produced by changes in semiconductor temperature produce oppositely polarized induced voltages in said secondary winding means, and means for alternately and oppositely controlling current conduction through said transistor means.

No references cited.